Inventors.
John M. Newman
Edward J. Posselt
By
Attorney

Inventors.
John M. Newman
Edward J. Posselt
By
Attorney.

Jan. 16, 1962   J. M. NEWMAN ET AL   3,017,555
DYNAMIC BRAKING CONTROL FOR SERIES WOUND MOTORS
Filed Aug. 6, 1956   6 Sheets-Sheet 5

Inventors.
John M. Newman
Edward J. Posselt
By
Attorney

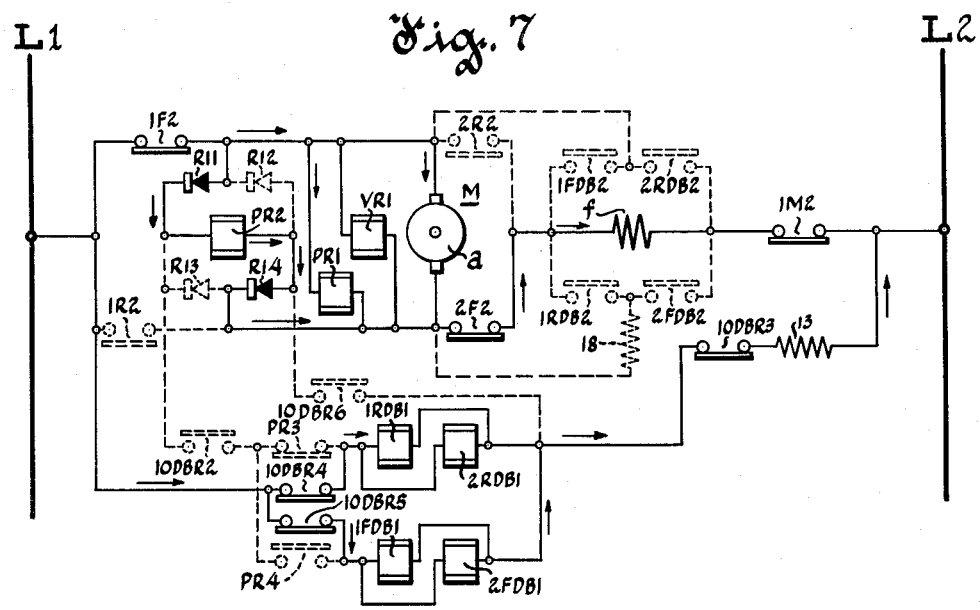
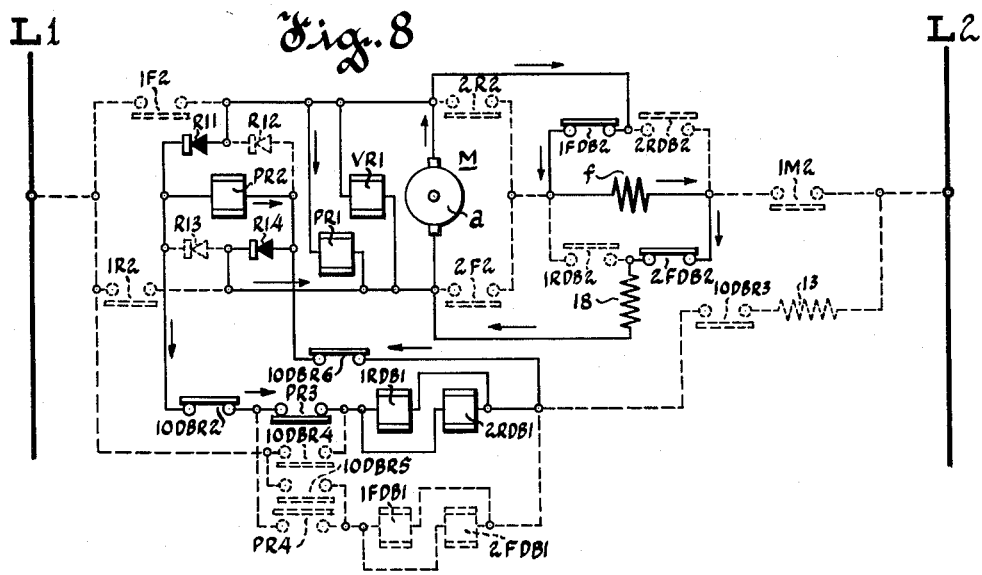

United States Patent Office 3,017,555
Patented Jan. 16, 1962

3,017,555
DYNAMIC BRAKING CONTROL FOR SERIES WOUND MOTORS
John M. Newman and Edward J. Posselt, Milwaukee, Wis., assignors to Cutler-Hammer, Inc., Milwaukee, Wis., a corporation of Delaware
Filed Aug. 6, 1956, Ser. No. 602,233
5 Claims. (Cl. 318—380)

This invention pertains to improved dynamic braking control for series wound motors.

It is a primary object to provide an aforementioned type of control which is characterized by affording dynamic braking for reversing operation of such motors and by affording the proper dynamic braking circuit in accordance with the direction of armature rotation at the moment dynamic braking operation is initiated.

Another object is to insure that the establishment of the proper dynamic braking circuit is entirely independent of the positioning of the master controller and power connections established for the motor at the moment dynamic braking operation is initiated.

A further object is to reduce the cost and increase the reliability of such type of dynamic braking control.

Other objects and advantages of the invention will hereinafter appear.

The accompanying drawings illustrate preferred embodiments of the invention which will now be described in detail, it being understood that the embodiments illustrated are susceptible of modifications without departing from the scope of the appended claims.

In the drawings:

FIG. 7 depicts active and inactive portions of the modified system during "forward" power operation, and FIG. 8 depicts active and inactive portions of the modified system during "forward" dynamic braking operation.

Figure 1:
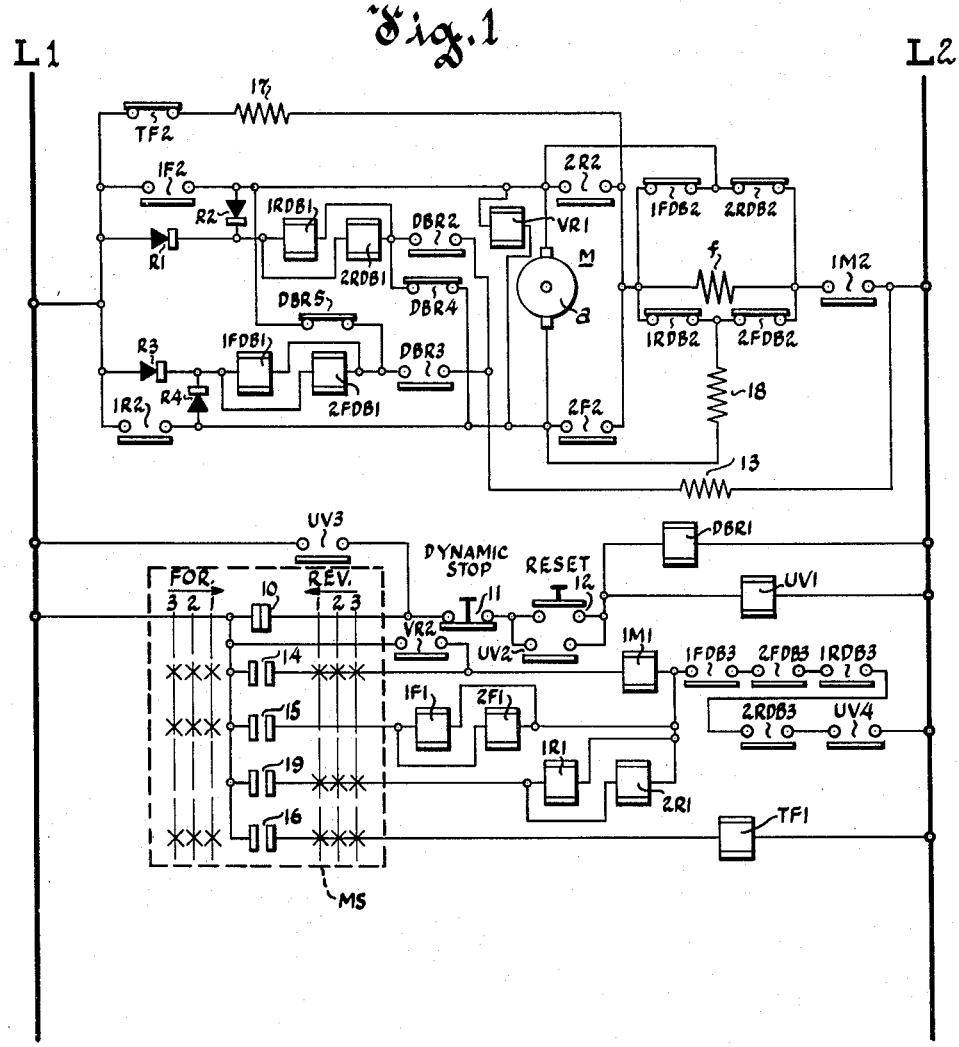
FIGURE 1 is a diagrammatic showing of a control system for a series wound D.C. motor embodying the invention.
Figure 2:
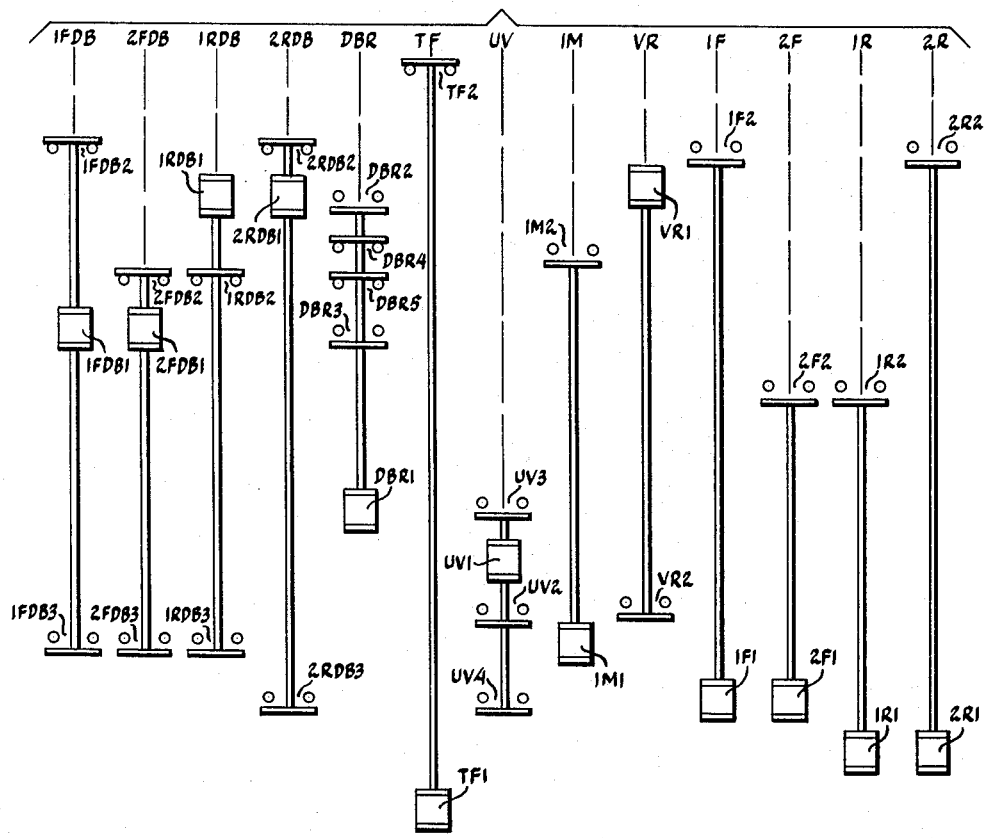
FIG. 2 is a schedule of relays and contactors shown in FIG. 1 with their contacts and operating coils alined.

Referring to FIG. 1, it shows a series wound D.C. motor having an armature $a$ and a series field winding $f$. A master controller depicted within the broken line rectangle MS is of a conventional type and is operable from an "off" to first, second and third operating positions "forward" and "reverse," respectively, to establish "forward" and "reverse" energizing connections for armature $a$ and field winding $f$ from D.C. power supply line L1 and L2, in connection with contacts carried by the controller and certain contactors and relays hereinafter to be described.

Contacts 10 of controller MS are closed in the "off" position of the latter and open in the "forward" and "reverse" operating positions. When closed, contacts 10 complete a portion of a circuit from line L1 through contacts 10 and a normally closed "dynamic braking stop" pushbutton switch 11 to the parallel connected normally open "reset" pushbutton switch 12 and normally open contacts UV2 of an undervoltage relay UV. Closure of switch 12 completes the circuit through operating coils DBR1 and UV1 of dynamic braking relay DBR and undervoltage relay UV, respectively, to line L2 to energize coils DBR1 and UV1. Contacts UV2 close to provide a maintaining circuit around switch 12 upon release of the latter, contacts UV3 close to provide a maintaining circuit around contacts 10, and contacts UV4 close to partially complete connections of one end of the operating coil 1M1 of a contactor 1M to line L2.

Energization of coil DBR1 results in closure of contacts; DBR2 to complete a circuit from line L1 through a half-wave rectifier R1, coils 1RDB1 and 2RDB1 of "reverse" dynamic braking contactors 1RDB and 2RDB, respectively, contacts DBR2 and a current limiting resistor 13 to line L2 to energize coils 1RDB1 and 2RDB1. Similarly, closure of contacts DBR3 completes a circuit from line L1 through a half-wave rectifier R2, coils 1FDB1 and 2FDB1 of "forward" dynamic braking contactors 1FDB and 2FDB, contacts DBR3, and resistor 13 to line L2 to energize coils 1FDB1 and 2FDB1. As a result of energization of coils 1RDB1, 2RDB1, 1FDB1 and 2FDB1, normally closed contacts 1RDB2, 2RDB2, 1FDB2 and 2FDB2 open to disconnect a dynamic braking circuit which will be hereinafter fully described. Also normally open contacts 1RDB3, 2RDB3, 1FDB3 and 2FDB3 close to complete the connection of said one side of coil 1M1 through the then closed contacts UV4 to line L2.

When controller MS is then operated from "off" to the "forward" operating positions a circuit will be completed from line L1 through contacts 14, coils 1M1 and the then closed contacts 1FDB3, 2FDB3, 1RDB3, 2RDB3 and UV4 to line L2 to energize coil 1M1. Energization of coil 1M1 results in closure of normally open contacts 1M2 to connect field winding $f$ of the motor to line L2.

Contacts 16 of controller MS close in the "forward" operating positions of the latter to complete a circuit from line L1 through contacts 16, coils 1F1 and 2F1 of "forward" direction power contactors 1F and 2F, respectively, and the then closed contacts 1FDB3, 2FDB3, 1RDB3, 2RDB3 and UV4 to line L2 to energize coils 1F1 and 2F1. Energization of coils 1F1 and 2F1 results in closure of contacts 1F2 and 2F2. Contacts 1F2 and 2F2 when closed, complete "forward" direction power connection for motor M from line L1 through contacts 1F2, armature $a$, contacts 2F2, field winding $f$ and the then closed contacts 1M2 to line L2. Contacts 15 of controller MS close in both the "forward" and "reverse" operating positions to complete an energizing circuit for coil TF1 of a relay TF. Energization of coil TF1 results in opening of contacts TF2 to interrupt connection of the other end of field winding $f$ through a resistor 17 to line L1.

When the "forward" power connections are thus established motor M will accelerate and run in the "forward" direction. In practice one or more accelerating resistors (not shown) would be connected in series between field winding $f$ and contacts 1M2 and would be successively shunted out of circuit on the second and higher operating positions of the controller (both in "forward" and "reverse" operating positions) through the medium of contacts carried in controller MS (not shown) and shunting contactors (not shown) under the control of the latter contacts. As such as well known and does not form part of the present invention they are omitted for the sake of simplicity.

Figure 3:
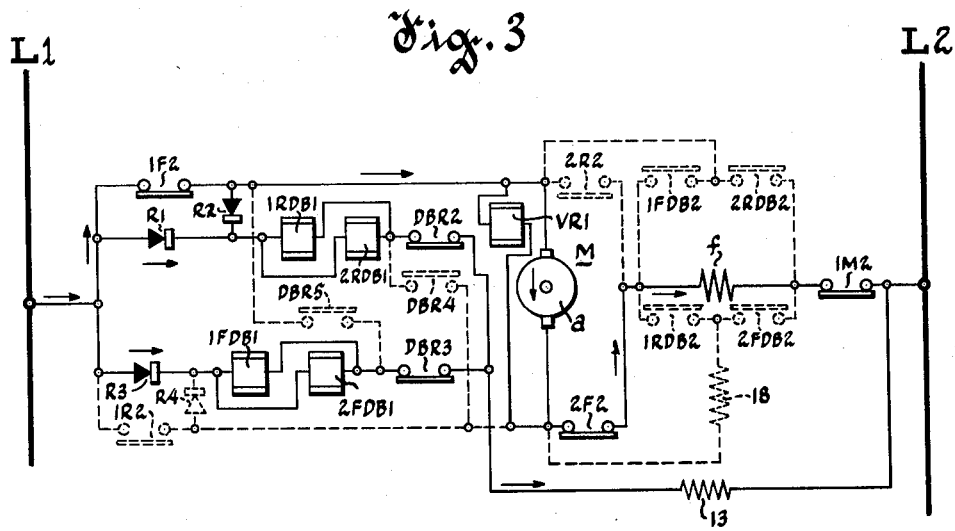
FIG. 3 depicts active and inactive portions of the system during "forward" power operation.

In FIG. 3, the solid lines show the energized portions of the system with the arrows depicting the direction of current flow through armature $a$ and field winding $f$, and also through rectifiers R1 and R2, coils 1RDB1, 2RDB1, 1FDB1 and 2FDB1 and resistor 13. The broken lines depict the inactive portions of the system inclusive of the dynamic braking circuit which will now be described.

Figure 4:
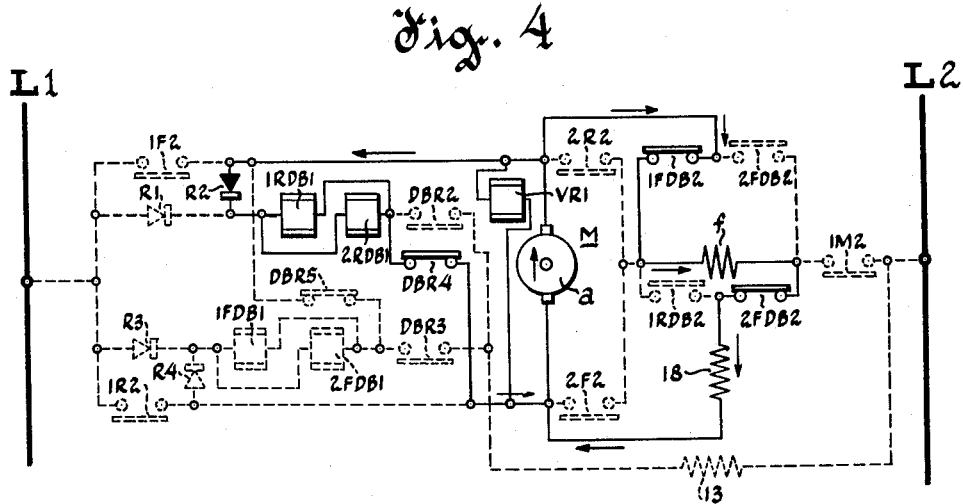
FIG. 4 depicts active and inactive portions of the system during "forward" dynamic braking operation.
Figure 5:
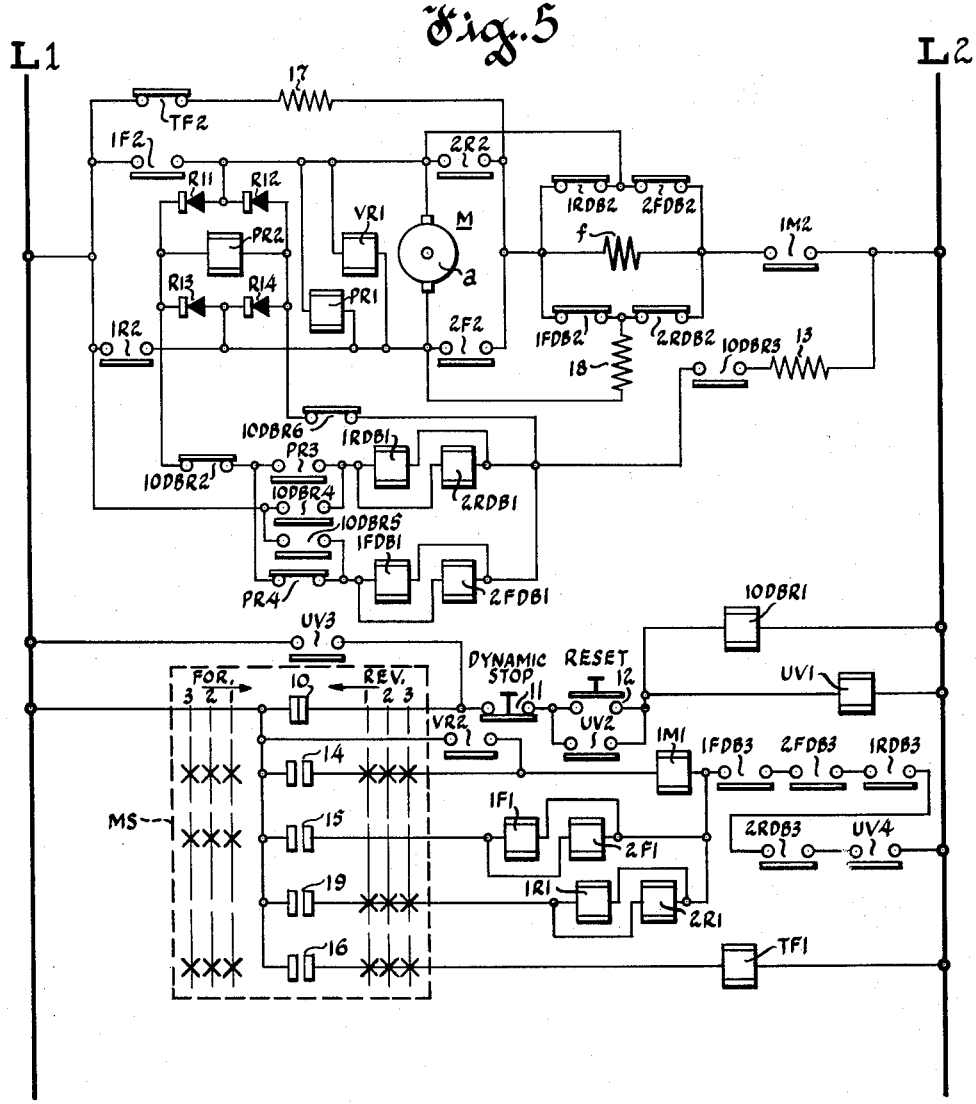
FIG. 5 is a diagrammatic showing of a modified form of control system.
Figure 6:
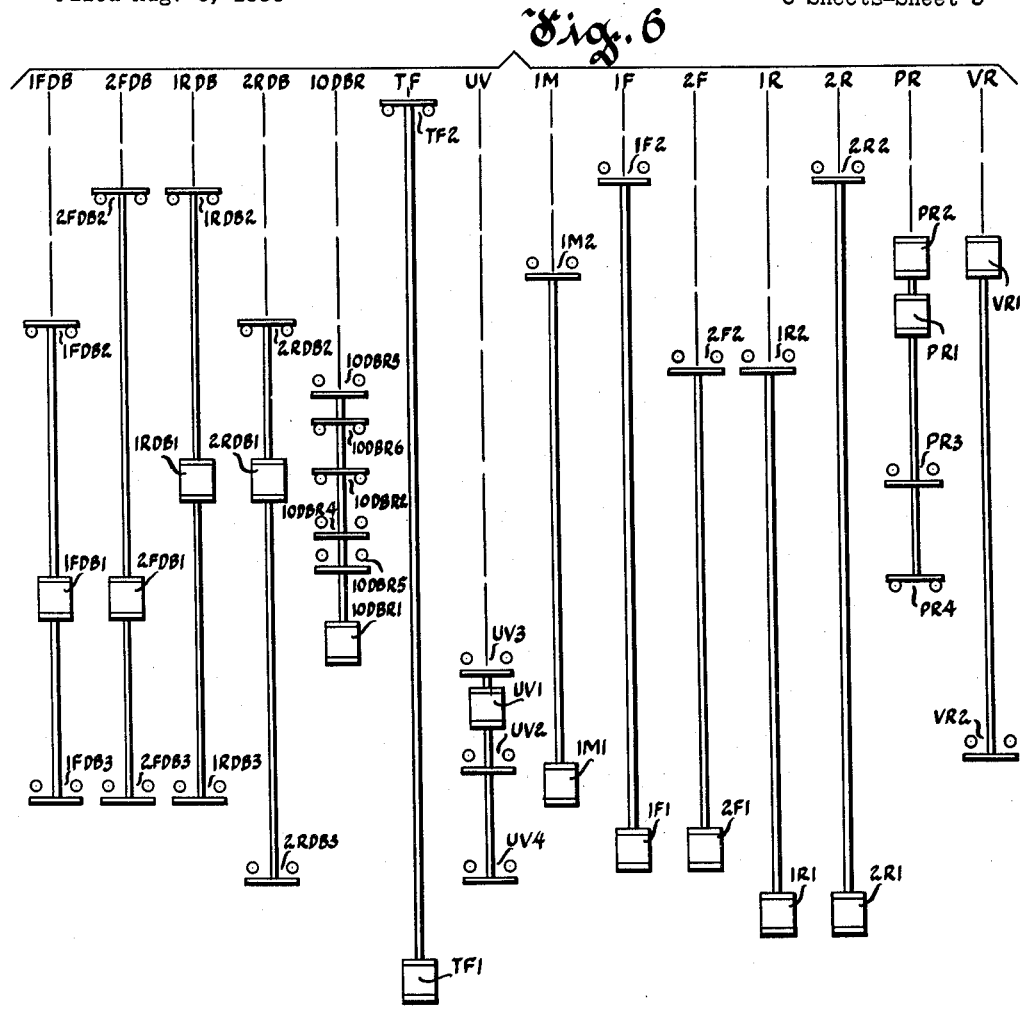
FIG. 6 is a schedule of relays and contactors shown in FIG. 5 with their contacts and operating coils alined.

If, when motor M is running in the "forward" direction, the power supply should fail, the power supply voltage decrease below the drop-out voltage of relay UV, or switch 11 be deliberately opened, relay UV will drop out to open its contacts UV2, UV3 and UV4. Consequently coils DBR1 and 1M1 will be deenergized. Contacts DBR2 and DBR3 thereupon open to disconnect coils 1RDB1, 2RDB1, 1FDB1 and 2FDB1 from resistor 13, contacts DBR4 close to reconnect coils 1RDB1 and 2RDB1 to the lower terminal of armature $a$ and contacts DBR5 close to reconnect coils 1FDB1 and 2FDB1 to the upper terminal of armature $a$. Contacts 1M2 of contactor 1M open to disconnect field winding $f$ from line L2. Coils 1F1 and 2F1 are also deenergized to open the "forward" direction contacts 1F2 and 2F2 and thereby disconnect armature $a$ from line L1. As a result armature $a$ and field winding $f$ will then be connected in a dynamic braking circuit depicted in full lines in FIG. 4. Thus due to the counter E.M.F. of armature $a$ current will flow from the upper terminal of armature $a$ through a half-wave rectifier R2, which is connected between the point common between contacts 1F2 and armature $a$ and the point common between rectifier R1 and coils 1RDB1 and 2RDB1, and through coils 1RDB1 and 2RDB1, the then closed contacts DBR4 to the lower terminal of armature $a$. Consequently contacts 1RDB2 and 2RDB2 will remain open. Such counter E.M.F. current, due to the blocking action of rectifier R1, cannot flow through coils 1FDB1 and 2FDB1 so the latter will be deenergized causing closure of their respective associated contacts 1FDB2 and 2FDB2. Thus the dynamic braking circuit for motor M can be traced from the upper terminal of armature $a$ through the then closed contacts 1FDB2, field winding $f$, the then closed contacts 2FDB2, a dynamic braking resistor 18 to the lower terminal of armature $a$.

With the dynamic braking circuit thus established armature $a$ will rapidly be brought to rest. As the armature speed approaches zero the counter E.M.F. generated by the armature will decrease to a value causing contactors 1RDB and 2RDB to drop out to close their associated contacts 1RDB2 and 2RDB2, and the system finally returns to the condition depicted in FIG. 1. Switch 12 must then be closed momentarily to energize coils DBR1 and UV1 of relays DBR and UV before controller MS will again be effective and dynamic braking contactors 1FDB, 2FDB, 1RDB and 2RDB energized.

When controller MS is operated from "off" to any one of the "reverse" operating positions contacts 10, 14 and 15 will operate as aforedescribed in connection with "forward" operation, contacts 16 will remain open and contacts 19 will close. Closure of contacts 19 completes a circuit from line L1 through contacts 19, operating coils 1R1 and 2R1 of "reserve" direction power contactor 1R and 2R, and the then closed contacts 1FDB3, 2FDB3, 1RDB3, 2RDB3 and UV4 to line L2 to energize coils 1R1 and 2R1. Energization of coils 1R1 and 2R1 results in closure of contacts 1R2 and 2R2 to complete "reverse" direction power connections for motor M from line L1 through contacts 1R2, armature $a$, contacts 2R2, field winding $f$ and the then closed contacts 1M2 to line L2. Motor M will accordingly accelerate and run in the "reserve" direction.

If, when motor M is running in the "reverse" direction dynamic braking action is initiated in one of the manners aforeindicated, relay UV will drop out to deenergize coil DBR1 and 1M1. Coils 1RDB1, 2RDB1, 1FDB1 and 2FDB1 will be disconnected from resistor 13 and reconnected as aforedescribed in connection with "forward" dynamic braking operation. Coils 1R1 and 2R1 will be deenergized to disconnect armature $a$ from line L1. Consequently the counter E.M.F. of armature $a$ will cause current to flow from the lower terminal of armature $a$ through a half wave rectifier R4, which is connected between a point common to contacts 1R2 and the lower terminal of armature $a$ and a point common between rectifier R2 and coils 1FDB1 and 2FDB1, and through coils 1FDB1 and 2FDB1, the then closed contacts DBR5 to the upper terminal of armature $a$. Due to the blocking action of rectifier R2 such current is prevented from flowing through coils 1RDB1 and 2RDB1, and as a result contacts 1RDB2 and 2RDB2 close while contacts 1FDB2 and 2FDB2 are held open. Thus a dynamic braking circuit for motor M is set up which may be traced from the lower terminal of armature $a$, through resistor 18, contacts 1RDB2, field winding $f$, and contacts 2RDB2 to the upper terminal of armature $a$. Consequently armature $a$ will rapidly be brought to rest. As the armature speed approaches zero the decrease in counter E.M.F. will decrease to a value causing contactors 1FDB and 2FDB to drop out and close their contacts 1FDB2 and 2FDB2, and the system finally returns to the condition depicted in FIG. 1.

The arrangement of coils 1RDB1, 2RDB1, 1FDB1 and 2FDB1, rectifiers R1, R2, R3 and R4, and contacts DBR2, DBR3, DBR4 and DBR5 of relay DBR hereinbefore described is such that the dynamic braking circuit established for the motor will depend entirely on the direction of armature rotation obtaining at the time dynamic braking operation is initiated and will automatically be the correct one for that direction of rotation.

As aforeindicated during power operation in either the "forward" or "reverse" direction coil TF1 is energized to open contacts TF2. If the operator moves controller to "off" to "drift" the counter E.M.F. of armature $a$ will cause current flow through a coil VR1 of a voltage relay VR, which is connected across armature $a$, to maintain such relay energized to keep its normally open contacts VR2, which parallel contacts 14 in controller MS, closed. Thus coil 1M1 wil remain energized to maintain its contacts 1M2 closed to in turn maintain field winding $f$ connected to line L2. As contacts 16 will be open coil TF1 will be deenergized to close its contacts TF2, and thereby complete a circuit from line L1 through contacts TF2, resistor 17, field winding $f$ and contacts 1M2 to line L2. Thus field winding $f$ will be energized independently of armature $a$ to maintain counter E.M.F. in armature $a$ during "drifting" and thus insure establishment of a dynamic braking circuit if dynamic braking action should be initiated during "drifting." As the speed of armature $a$ approaches zero during "drifting" the energization of coil VR1 decreases and finally drops its associated contacts VR2 to deenergize coil 1M1 and thereby open contacts 1M2 to disconnect field winding $f$ from line L2.

The modified form of FIGS. 5 through 8 is similar to that of FIGS. 1 to 4 and like elements are designated by corresponding reference numerals. This modified form differs in the employment of a polarized relay PR, a different arrangement of half-wave rectifiers and directional dynamic braking relay coils 1RDB1, 2RDB1, 1FDB1 and 2FDB1, and substitution of a six pole relay 10DBR for the five pole relay DBR. Relay PR has a coil PR1 directly connected across armature $a$, and a second coil PR2 connected across one diagonal of the rectifier bridge, comprising the half-wave rectifiers R11, R12, R13 and R14. The other diagonal of the rectifier bridge is connected across armature $a$. It may be assumed that when current flow is in the same direction through coils PR1 and PR2 that they act cumulatively to close contacts PR3 and open contacts PR4. When current flow through coil PR1 is in the opposite direction, which occurs during power and dynamic braking operation in the "reverse" direction, it may be assumed that coils PR1 and PR2 act differentially to open contacts PR3 and close contacts PR4. It will be noted that current flow through coil PR2 will always be in the same direction regardless of direction of operation of armature $a$ at the time dynamic braking operation is initiated, due to its arrangement in the rectifier bridge and the arrangement of the rectifiers in the bridge.

Contacts PR3 are connected on their left-hand side in series with normally closed contacts 10DBR2 of relay 10DBR to the point common between one end of coil PR2 and rectifiers R11 and R13. The right-hand side of contacts PR3 is connected in series with the parallel connected coils 1RDB1 and 2RDB1 of relays 1RDB and 2RDB, normally open contacts 10DBR3 of relay 10DBR and current limiting resistor 13 to line L2.

The point common between contacts PR3 and coils 1RDB1 and 2RDB1 is connected in series with normally open contacts 10DBR4. Parallel connected coils 1FDB1 and 2FDB1 are connected at corresponding ends in series with normally open contacts 10DBR5 to line L1 and are also connected at the same ends in series with contacts PR4 to the point common between contacts 10DBR2 and PR3. The other corresponding ends of coils 1FDB1 and 2FDB1 are connected in series with contact 10DBR3 and resistor 13 to line L2. The point common between rectifiers R12 and R14 and coil PR2 is connected in series with normally closed contacts 10DBR6 of relay 10DBR to the point common between coils 1RDB1, 2RDB1, 1FDB1 and 2FDB1 and contacts 10DBR3.

Closure of switch 12, of course, energizes coils UV1 and 10DBR1 to provide a normal "off" circuit condition as hereinbefore described.

During "forward" running operation of motor M relay 10DBR will be energized to close its contacts 10DBR3, 10DBR4 and 10DBR5 thereby to open contacts 1FDB2, 2FDB2, 1RDB2 and 2RDB2 and disconnect the dynamic braking current. Consequently the circuits established will be those shown in full line in FIG. 7 with the direction of current flow as depicted by the arrows.

Now let it be assumed that the dynamic braking operation is initiated as before described in connection with the first embodiment. Coils UV1, 10DBR1, 1M1, 1F1 and 2F1 will as result be deenergized. Consequently contacts 1M2, 1F2, 2F2, 10DBR3, 10DBR4 and 10DBR5 open and contacts 10DBR2 and 10DBR6 close to provide the circuits for dynamic braking depicted in full lines in FIG. 8. The counter E.M.F. of armature $a$ will result in a current flow from the upper terminal of the armature $a$ through coils PR1 and PR2 in the same direction as in "forward" power operation. Thus contacts PR3 are maintained closed and contacts PR4 are maintained open. As a result current flows through rectifier R11, the then closed contacts 10DBR2 and PR3, coils 1RDB1 and 2RDB1, the then closed contacts 10DBR6, rectifier R14 to the lower terminal of armature $a$ to maintain coils 1RDB1 and 2RDB1 energized to hold open contacts 1RDB2 and 2RDB2. Due contacts PR4 and 10DBR5 then being open coils 1FDB1 and 2FDB1 will be deenergized to effect closure of contacts 1FDB2 and 2FDB2. The dynamic braking circuit for the motor can accordingly be traced from the upper terminal of armature $a$, through contacts 1FDB2, field winding $f$, contacts 2FDB2, resistor 18 to the lower terminal of armature $a$.

During "reverse" power operation of the motor current flow through coil PR1 reverses in direction, and thus contacts PR3 will open and contacts PR4 will close. However, such opening of contacts PR3 and closure of contacts PR4 has no effect on the energization of coils 1RDB1, 2RDB1, 1FDB1 and 2FDB1, as the closure of contacts 10DBR3, 10DBR4 and 10DBR5 complete the energizing connections to these coils during "reverse" power operation. However, during dynamic braking operation, following power operation in the "reverse" direction, contacts PR3 remain open and contacts PR4 remain closed. Thus the energizing circuit will be maintained for coils 1FDB1, 2FDB1 and PR2 which can be traced from the lower terminal of armature $a$, through rectifier R13, the then closed contacts 10DBR2 and PR4, coils 1FDB1 and 2FDB1, then closed contacts 10DBR6 and rectifier 12 to the upper terminal of armature $a$. Consequently contacts 1FDB2 and 2FDB2 will remain open. Due to contacts PR3 then being open coils 1RDB1 and 2RDB1 will be deenergized to close contacts 1RDB2 and 2RDB2. The dynamic braking circuit for the motor can then be traced from the lower terminal of armature $a$ through resistor 18, contacts 1RDB2, field winding $f$, contacts 2RDB2 to the upper terminal of armature $a$.

We claim:

1. The combination with a series wound motor and means for selectively establishing forward and reverse power connections for the motor and for interrupting said power connections, of dynamic braking control comprising a resistor, first and second electromagnetic switch means energizable to connect said resistor, said armature and the motor field winding in a dynamic braking loop circuit with said armature and said field winding connected appropriately for forward or reverse rotation of said armature, respectively, said switch means each having an operating coil which are concurrently energizable to interrupt said loop circuit, means for concurrently connecting and disconnecting said operating coils of said switch means from a source of constant voltage, and means including unidirectional conducting means connected in circuit with said operating coils and said armature to be responsive to disconnection of said coils from the source of constant voltage and selectively apply armature voltage to the operating coil of one or the other of said switch means in accordance with the direction of rotation of said armature when said power connections are interrupted, said unidirectional conducting means comprising two pairs of half-wave rectifiers, one rectifier of each pair establishing current flow through the operating coil of an associated switch means while the other rectifier of each pair blocks current flow through the operating coil of the other switch means in accordance with the polarity of armature voltage during dynamic braking.

2. The combination according to claim 1, wherein said means for concurrently connecting and disconnecting said operating coils from a source of constant voltage includes means acting upon disconnecting action to interrupt power connections to the motor.

3. The combination according to claim 1, wherein said means for concurrently connecting and disconnecting said operating coils from a source of constant voltage includes means selectively operable to initiate connecting and disconnecting action and further includes means responsive to voltage failure to initiate disconnecting action.

4. The combination according to claim 1 together with means under the control of the first mentioned means to establish power connections to the series field winding only when normal forward and reverse power connections for the motor are interrupted.

5. The combination with a series wound motor and means for selectively establishing forward and reverse power connections for the motor and for interrupting said power connections, of dynamic braking control comprising a resistor, first and second electromagnetic switch means energizable to connect said resistor, said armature and the motor field winding in a dynamic braking loop circuit with said armature and said field winding connected appropriately for forward or reverse rotation of said armature, respectively, said switch means each having an operating coil which are concurrently energizable to interrupt said loop circuit, means for concurrently connecting and disconnecting said operating coils of said switch means from a source of constant voltage, and means including unidirectional conducting means connected in circuit with said operating coils and said armature to be responsive to disconnection of said coils from the source of constant voltage and selectively apply armature voltage to the operating coil of one or the other of said switch means in accordance with the direction of rotation of said armature when said power connections are interrupted, said last mentioned means also including a relay having two control coils one of which is connected across said armature, and wherein said unidirectional conducting means comprises half-wave rectifiers connected in a bridge circuit with said armature and the other control coil of said relay to insure current flow through the latter coil always in one direction, and said relay in accordance with the direction of current flow through its first mentioned control coil selectively connecting the operating coils of one or the other of said first and second switch means in circuit with said armature.

References Cited in the file of this patent
UNITED STATES PATENTS
2,646,541    Lesniak _____ July 21, 1953